United States Patent Office 3,150,152
Patented Sept. 22, 1964

3,150,152
NOVEL PREPARATION OF ESTRONE
Robert Joly, Montmorency, Julien Warnant, Neuilly-sur-Seine, Jean Jolly, Clichy-sous-Bois, and Armand Guillemette, Noisy-le-Sec, France, assignors to Roussel-UCLAF, S.A., Paris, France, a corporation of France
No Drawing. Filed July 11, 1962, Ser. No. 209,229
Claims priority, application France, July 21, 1961, 868,571
12 Claims. (Cl. 260—326.5)

The invention relates to a novel process for the preparation of estrone. The invention also relates to novel intermediates thereof.

The preparation of 19-nor steroids such as 19-nortestosterone and estradiol from the conjugated tricyclic hydroxy ketone having the formula

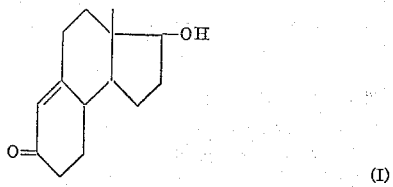

(I)

has been described by Velluz et al. (Compt. Rend. of Acad. Sci., vol. 250, pp. 1084–85 and 1510–11, and Ang. Chem., vol. 72, 1960, pp. 725–730). In this total synthesis the A ring was formed starting from a non-conjugated isomer of Formula I having the formula

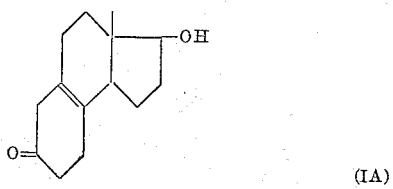

(IA)

by forming the benzoate ester of the said isomer to protect the hydroxy group from the dehydrating effect of agents such as sulfuric acid used in subsequent steps and because the benzoyloxy derivatives easily crystallized. However, the saponification of esters of $\Delta^{4,9}$-19-nor steroids is usually difficult, particularly for benzoic acid esters.

It is an object of the invention to provide a novel process for the preparation of estrone without saponification of 17β-ol esters.

It is another object of the invention to provide novel intermediates for the preparation of estrone.

These and other objects and advantages of the invention will become obvious from the following detailed description.

The process of the invention for the preparation of estrone comprises oxidizing $\Delta^9$-des-A-estrene-17β-ol-5-one to form $\Delta^9$-des-A-estrene-5,17-dione, reacting the latter with a secondary amine selected from the group consisting of dilower alkyl amines piperidine, morpholine, and pyrrolidine to form the 5-enamine of $\Delta^9$-des-A-estrene-5,17-dione, condensing the latter with 1,3-dichloro-2-butene to form 3-chloro-$\Delta^{2,9}$-4,5-seco-estradiene-5,17-dione, hydrolyzing the latter under acidic conditions to form $\Delta^9$-4,5-seco-estrene-3,5,17-trione, cyclizing the latter under alkaline conditions to form $\Delta^{4,9}$-estradiene-3,17-dione, isomerizing the latter in the presence of a basic palladium catalyst to form estrone and recovering the latter.

A preferred method of the process of the invention for the preparation of estrone comprises oxidizing $\Delta^9$-des-A-estrene-17β-ol-5-one with a sulfuric acid-chromic acid mixture to form $\Delta^9$-des-A-estrene-5,17-dione, reacting the latter with pyrrolidine to form 5-pyrrolidyl-$\Delta^{5(10),9(11)}$-des-A-estradiene-17-one, condensing the latter with 1,3-dichloro-2-butene in the presence of potassium iodide in dimethylformamide to form 3-chloro-$\Delta^{2,9}$-4,5-seco-estradiene-5,17-dione, hydrolyzing the latter in the presence of sulfuric acid and acetic acid to form $\Delta^9$-4,5-seco-estrene-3,5,17-trione, cyclizing the latter in the presence of an alkali metal alcoholate such as sodium tert.-amylate to form $\Delta^{4,9}$-estradiene-3-17-dione, isomerizing the latter in the presence of palladized carbon black to estrone and recovering the latter. The reaction scheme is illustrated in Table I.

TABLE 1

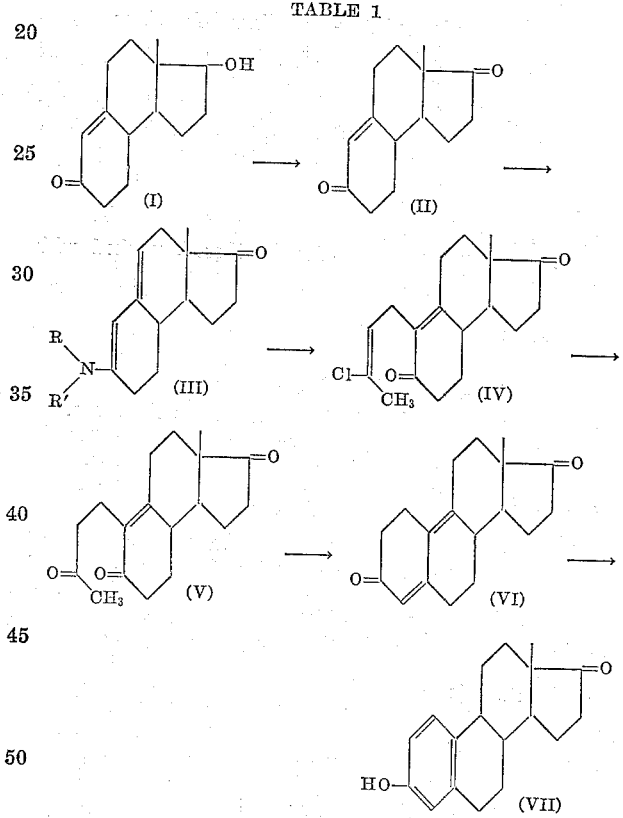

wherein R and R' are lower alkyl radicals and when taken together with the nitrogen atom form a pyrrolidyl radical, a piperidyl radical, and morpholino.

The process of the invention has the advantage of having a 17-one group in the intermediate compounds thereby avoiding the necessity of forming an ester of the 17-hydroxy group. Also, the 17-ones can be directed ethynylated.

Examples of suitable secondary amines used to form the 5-enamino compounds are dimethyl amine, diethyl amine, dipropylamine, methylethyl amine, pyrrolidine, piperidine, morpholine, etc.

In the following example there are described several preferred embodiments of the invention to illustrate the invention. However, it should be understood that the invention is not intended to be limited to the specific embodiments.

*Preparation of $\Delta^9$-Des-A-Estrene-17β-Ol-5-One*

5 - methoxy-$\Delta^{5,7,9}$-des-A-estratriene-17β-ol, having a melting point of 69° C. and a specific rotation $[\alpha]_D^{20}=+18°$ (c.=1% in methanol), prepared according to U.S. patent application 36,172 and designated in the said patent by: "1β-hydroxy-6-methoxy-9aβ-methyl-3a,8,9,9a-tetrahydrobenzo-[e]-indane," was reduced by the Birch method, J. Chem. Soc. 1944, to form 5-methoxy-$\Delta^{5,8}$-des-A-estradiene-17β-ol.

40 gm. of this product were dissolved in a mixture of 140 cc. of methylene chloride and 80 cc. of methanol. 20 cc. of 22° Bé. hydrochloric acid were added and the mixture was heated to reflux under agitation for a period of 18 hours. After cooling, the mixture was poured into a mixture of water and ice and extracted with methylene chloride. The extracts were washed with a saturated solution of sodium bicarbonate and with water, dried and then evaporated to dryness under a weak vacuum. The residue consisted of $\Delta^9$-des-A-estrene-17β-ol-5-one, I, having a melting point of 109° C. and a specific rotation $[\alpha]_D^{20}=-29°\pm3°$ (c.=1% in methanol) which compound was used without further purification for the synthesis which follows.

EXAMPLE

*Preparation of $\Delta^{4,9}$-Estradiene-3-17-Dione*

*Step A—$\Delta^9$-Des-A-Estrene-5,17-Dione, II.*—25 gm. of $\Delta^9$-des-A-estrene-17β-ol-5-one, I, were dissolved in 50 cc. of acetone at 40° C. The mixture was cooled and a sulfochromic acid mixture comprising 33 cc. of 8 N sulfuric acid and 11.25 gm. of chromic acid were added drop by drop. 150 cc. of water were slowly introduced and the mixture was agitated at room temperature for a period of 45 minutes. $\Delta^9$-des-A-estrene-5,17-dione, II, crystallized. The product was vacuum filtered, washed with water and dried. 17.1 gm. of the product, melting at 137° C. and having a specific rotation $[\alpha]_D^{20}=+85.5°\pm1°$ (c.=1% in methanol) were recovered.

Ultraviolet spectra:

$$\lambda_{max.}=237 \text{ m}\mu, \text{E}_{1\text{ cm.}}^{1\%}=680, \epsilon=14,850$$

This compound is not described in the literature.

*Step B—5 - pyrrolidyl - $\Delta^{5(10),9(11)}$-des-A-estradiene-17-one, III.*—15 gm. of $\Delta^9$-des-A-estrene-5,17-dione, II, were introduced into 75 cc. of methanol under an atmosphere of nitrogen. 8.1 cc. of pyrrolidine were added and the reaction mixture was allowed to stand at room temperature for a period of one hour. The 5-pyrrolidyl-$\Delta^{5(10),9(11)}$-des-A-estradiene-17-one, III, crystallized very rapidly. The product was vacuum filtered, washed with methanol and dried. 17.65 gm. of the product, having a melting point of 143° C. and a specific rotation $[\alpha]_D^{20}=+424°\pm5°$ (c.=0.5% in dioxane), were obtained.

This product is not described in the literature.

*Step C—3 - chloro-$\Delta^{2,9}$-4,5-seco-estradiene-5,17-dione, IV.*—1 gm. of 5-pyrrolidyl-$\Delta^{5(10),9(11)}$-des-A-estradiene-17-one, III, were introduced into 5.2 cc. of a solution of potassium iodide in dimethyl-formamide, testing about 12%, under an atmosphere of nitrogen and while cooling to 0° C. Then 2.7 cc. of a 30% solution of 1,3-dichloro-2-butene in dimethylformamide were added drop by drop. The reaction mixture, cooled by an ice bath, was allowed to stand for a period of an hour and a half. Next, 1.6 cc. of water were added and a mixture of water, dimethylformamide and dichlorobutene was distilled therefrom while adding successively water for a period of two hours. The residue was poured into water and extracted with isopropyl ether. The ethereal solution was treated with animal black, filtered, dried and evaporated to dryness under vacuum. 1.133 gm. of 3-chloro-$\Delta^{2,9}$-4,5-seco-estradiene-5,17-dione, IV, containing 11% of chlorine (the theoretical being 11.56%) were obtained. This compound was used as such for the next step of the synthesis.

This compound is not described in the literature.

*Step D—$\Delta^9$-4,5-seco-estrene-3,5,17-trione, V.*—1 gm. of 3-chloro-$\Delta^{2,9}$-4,5-seco-estradiene-5,17-dione, IV, in an acetic acid solution was introduced into 5 cc. of sulfuric acid and the reaction mixture was cooled to −20° C. The reaction mixture was allowed to stand for a period of 10 minutes at room temperature and then it was poured into water saturated with sodium bicarbonate and extracted with methylene chloride. The extracts were combined, washed with water and evaporated to dryness under vacuum. The residue was crystallized from isopropyl ether and 604 mg. of $\Delta^9$-4,5-seco-estrene-3,5,17-trione, V, were obtained having a melting point of 82° C. and a specific rotation $[\alpha]_D^{20}=+37°\pm0.5°$ (c.=1% in methanol).

*Analysis.*—$C_{18}H_{24}O_3$: Molecular weight=288.37. Calculated: C, 74.97%; H, 8.38%. Found: C, 74.8%; H, 8.3%.

Ultraviolet spectra:

$$\lambda_{max.}=248 \text{ m}\mu, \text{E}_{1\text{ cm.}}^{1\%}=496, \epsilon=14,300$$

This compound is not described in the literature.

*Step E—$\Delta^{4,9}$-estradiene-3,17-dione, VI.*—0.400 gm. of $\Delta^9$-4,5-seco-estrene-3,5,17-trione, V, were dissolved in 16 cc. of toluene under an atmosphere of nitrogen. The mixture was cooled to 0° C. and 0.7 cc. of a solution of sodium t.-amylate in 4 cc. of toluene was added. The reaction mixture was allowed to stand at a temperature of 0° to 2° C. for a period of an hour and a half and then for a period of 30 minutes at 20° to 22° C. Acetic acid was added until the pH was 6–7. The reaction mixture was washed with water, dried and then evaporated to dryness under vacuum.

The residue of 420 mg. was purified by subjecting it to chromatography over silica gel and elution with methylene chloride containing 0.5 to 0.7% of acetone. This furnished, with a yield of 55%, $\Delta^{4,9}$-estradiene-3,17-dione, VI, having a melting point of 141° C. and a specific rotation $[\alpha]_D^{20}=-198°\pm1°$ (c.=0.5% in methanol).

Ultraviolet spectra:

$$\lambda \text{ inflection toward } 235 \text{ m}\mu, \text{E}_{1\text{ cm.}}^{1\%}=172$$

$$\lambda_{max.} \text{ at } 301 \text{ m}\mu, \text{E}_{1\text{ cm.}}^{1\%}=686, \epsilon=20,000$$

*Step F—Estrone.*—0.5 gm. of $\Delta^{4,9}$-estradiene-3,17-dione, VI, were introduced into 50 cc. of ethanol and 0.5 gm. of a catalyst of palladized carbon black containing 15% of palladium were added. The catalyst was prepared at a pH of 9 by the action of sodium hydroxide on palladium chloride in the presence of activated carbon. The reaction mixture was heated to the reflux temperature of ethanol under an atmosphere of nitrogen and the heating was maintained for a period of 4 hours. The catalyst was vacuum filtered and the solution was evaporated to dryness under vacuum. The residue was recrystallized in alcohol and furnished 0.34 gm. of estrone, VII, having a melting point of 260° C. and a specific rotation $[\alpha]_D^{20}=+161°$ (c.=1% in dioxane).

Various modifications of the process of the invention may be made without departing from the spirit or scope thereof, and it is to be understood that the invention is to be limited only as defined in the appended claims.

We claim:

1. A process for the preparation of estrone which comprises oxidizing $\Delta^9$-des-A-estrene-17β-ol-5-one to form $\Delta^9$-des-A-estrene-5,17-dione, reacting the latter with a secondary amine selected from the group consisting of di-lower alkyl amines, piperidine, morpholine and pyrrolidine to form the 5-enamine of $\Delta^9$-des-A-estrene-5,17-dione, condensing the latter with 1,3-dichloro-2-butene to form 3-chloro-$\Delta^{2,9}$-4,5-seco-estradiene-5,17-dione, hydrolyzing the latter under acidic conditions to form $\Delta^9$-

4,5-seco-estrene-3,5,17-trione, cyclizing the latter under alkaline conditions to form $\Delta^{4,9}$-estradiene-3,17-dione, isomerizing the latter in the presence of a basic palladium catalyst to form estrone and recovering the latter.

2. The process of claim 1 wherein the oxidation is effected with a sulfuric acid-chromic acid mixture.

3. The process of claim 1 wherein the condensation is effected in the presence of potassium iodide in dimethylformamide.

4. The process of claim 1 wherein the hydrolysis is effected with sulfuric acid in acetic acid.

5. The process of claim 1 wherein the cyclization is effected in the presence of sodium tert.-amylate.

6. The process of claim 1 wherein the isomerization is effected in the presence of palladized carbon black.

7. A process for the preparation of estrone which comprises oxidizing $\Delta^9$-des-A-estrene-17$\beta$-ol-5-one with a mixture of sulfuric acid and chromic acid to form $\Delta^9$-des-A-estrene-5,17-dione, reacting the latter with pyrrolidine to form 5-pyrrolidino-$\Delta^{5(10),9(11)}$-des-A-estradiene-17-one, condensing the latter with 1,3-dichloro-2-butene in the presence of potassium iodide in dimethylformamide to form 3-chloro-$\Delta^{2,9}$-4,5-seco-estradiene-5,17-dione, hydrolyzing the latter in the presence of sulfuric acid in acetic acid to form $\Delta^9$-4,5-seco-estrene-3,5,17-trione, cyclizing the latter in the presence of sodium tert.-amylate to form $\Delta^{4,9}$-estradiene-3,17-dione, isomerizing the latter in the presence of palladized carbon black to form estrone and recovering the latter.

8. $\Delta^9$-des-A-estrene-5,17-dione.

9. A compound of the formula

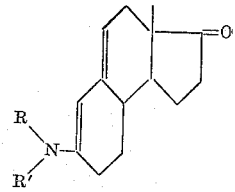

wherein R and R′ are selected from the group consisting of lower alkyl and when taken together with the nitrogen atom form a radical selected from the group consisting of pyrrolidino, piperidino and morpholino.

10. 5-pyrrolidino-$\Delta^{5(10),9(11)}$-des-A-estradiene-17-one.

11. 3-chloro-$\Delta^{2,9}$-4,5-seco-estradiene-5,17-dione.

12. $\Delta^9$-4,5-seco-estrene-3,5,17-trione.

References Cited in the file of this patent

UNITED STATES PATENTS

| | | |
|---|---|---|
| 3,019,252 | Nomine et al. | Jan. 30, 1962 |
| 3,050,550 | Nomine et al. | Aug. 21, 1962 |